US012556151B1

United States Patent
Alnabulsi et al.

(10) Patent No.: US 12,556,151 B1
(45) Date of Patent: Feb. 17, 2026

(54) DIGITAL CONTROL OF ANALOG AMPLIFICATION GAIN IN A RECEIVER DEVICE

(71) Applicant: Marvell Asia Pte Ltd, Singapore (SG)

(72) Inventors: Basel Alnabulsi, Ottawa (CA); Mohammad Sadegh Dadash, Nepean (CA); Kevin Parker, Nepean (CA); Luke Wang, San Jose, CA (US)

(73) Assignee: Marvel Asia Pte Ltd, Singapore (SG)

( * ) Notice: Subject to any disclaimer, the term of this patent is extended or adjusted under 35 U.S.C. 154(b) by 316 days.

(21) Appl. No.: 18/118,059

(22) Filed: Mar. 6, 2023

Related U.S. Application Data (60) Provisional application No. 63/316,435, filed on Mar. 4, 2022.

(51) Int. Cl.
  *H03G 3/30* (2006.01)
  *H03F 1/02* (2006.01)
  *H03M 1/12* (2006.01)
  *H04B 10/60* (2013.01)

(52) U.S. Cl.
  CPC ......... *H03G 3/3089* (2013.01); *H03F 1/0216* (2013.01); *H03M 1/1245* (2013.01); *H03M 1/129* (2013.01); *H04B 10/60* (2013.01); *H03F 2200/105* (2013.01)

(58) Field of Classification Search
  CPC .. H03G 3/3089; H03F 1/0216; H03M 1/1245; H03M 1/129; H04B 10/60
  USPC .......................................................... 39/202
  See application file for complete search history.

(56) References Cited

U.S. PATENT DOCUMENTS

| 5,101,416 A * | 3/1992 | Fenton ..................... G01S 19/37 375/150 |
| 6,073,848 A * | 6/2000 | Giebel ............... G06K 7/10851 235/462.26 |
| 6,292,517 B1 * | 9/2001 | Jeffress ................. H04L 25/062 375/227 |
| 11,381,269 B1 | 7/2022 | Alnabulsi |
| 11,398,931 B2 | 7/2022 | Wu et al. |

(Continued)

FOREIGN PATENT DOCUMENTS

GB 2337380 A * 11/1999 ........... H03G 3/3052

OTHER PUBLICATIONS

U.S. Appl. No. 17/993,776 entitled "Tracking of Sampling Phase in a Receiver Device," filed Jan. 20, 2023.

*Primary Examiner* — Kenneth N Vanderpuye
*Assistant Examiner* — Asif Shameem (57) ABSTRACT

A receiver device includes an analog front end configured to receive a communication signal transmitted over a communication channel. The analog front end including an amplifier comprising one or more amplification stages configured to amplify the communication signal. The receiver device also includes a sampler coupled to an output of a first amplification stage among the one or more amplification stages, the sampler configured to generate digital samples of the communication signal at the output of the first amplification stage, and a digital gain control engine configured to control, based on the digital samples of the communication signal at the output of the first amplification stage, a gain of at least the first amplification stage of the amplifier in the analog front end to track an envelope of an amplitude the communication signal at the output of the first amplification stage within a first amplitude range.

20 Claims, 5 Drawing Sheets

(56) References Cited

U.S. PATENT DOCUMENTS

| | | | | |
|---|---|---|---|---|
| 2002/0003586 A1* | 1/2002 | Busson | ............... | H03G 3/3068 |
| | | | | 348/731 |
| 2006/0127100 A1* | 6/2006 | Frankel | ................. | H04B 10/29 |
| | | | | 398/158 |
| 2007/0280069 A1* | 12/2007 | Cheng | ............. | G11B 20/10009 |
| | | | | 369/47.25 |

* cited by examiner

DIGITAL CONTROL OF ANALOG AMPLIFICATION GAIN IN A RECEIVER DEVICE

CROSS REFERENCES TO RELATED APPLICATIONS

This application claims the benefit of U.S. Provisional Patent App. No. 63/316,435, entitled "Digital Signal Processing (DSP) Controlled Multi-Stage Gain in High Speed Links," filed on Mar. 4, 2022, the disclosure of which is hereby expressly incorporated herein by reference in its entirety.

FIELD OF TECHNOLOGY

The present disclosure relates generally to communication links, and more particularly to gain control for amplification of signals received over communication links.

BACKGROUND

In communication systems, a receiver device typically includes an analog front end that receives and amplifies a communication signal transmitted over a communication link, and analog to digital converter that generates digital samples of the amplified communication signal, and a processor that further processes the digital samples of the communication signal. Due to a potentially wide range of power of the received communication signal, one or more variable gain amplification stages are typically employed to amplify the communication signal, where gain of the one or more amplification stages is controlled based on the power of the communication signal, to amplify the communication signal to a level that is within an input signal level supported by the analog to digital converter. A typical gain feedback loop uses a gain feedback loop that includes on a nonlinearity, such as a rectifier, coupled with a lowpass filter. A drawback of such analog gain control configuration is that the gain feedback loop typically has a relatively low cut-off frequency. As a result, the gain feedback loop does not see frequency content of the signal at high frequencies, such as near the Nyquist frequency of the signal. Moreover, in such typical analog configurations, the gain feedback loop does not see peaks that are infrequent and can saturate the analog to digital converter and cause signal distortion and burst errors in the receiver device.

In some systems, back off is added to ensure that amplification gain at high frequency and infrequent peaks are handled without causing distortion events. However, such back off in typical systems generally degrades the noise performance of the receiver. Moreover, the required back off changes with the frequency response of the amplifier which can be impacted by process and temperature variations. Thus, typical receivers that employ analog gain control loops cannot provide operation in which noise and distortion are sufficiently balanced over the operating frequency and temperature range of the receiver device.

SUMMARY

In an embodiment, a receiver device comprises: an analog front end configured to receive a communication signal transmitted over a communication channel, the analog front end including an amplifier comprising one or more amplification stages configured to amplify the communication signal; a sampler coupled to an output of a first amplification stage among the one or more amplification stages, the sampler configured to generate digital samples of the communication signal at the output of the first amplification stage; and a digital gain control engine configured to control, based on the digital samples of the communication signal at the output of the first amplification stage, a gain of at least the first amplification stage of the amplifier in the analog front end to track an envelope of an amplitude the communication signal at the output of the first amplification stage within a first amplitude range.

In another embodiment, a method for controlling gain in a receiver device includes: receiving, by an analog front end of the receiver device, a communication signal transmitted over a communication channel; amplifying the communication signal by an amplifier in the analog front end, the amplifier comprising one or more amplification stages; generating, by a sampler of the receiver device, digital samples of the communication signal at an output of a first amplification stage among the one or more amplification stages; and controlling, by a digital gain control engine of the receiver device based on the digital samples of the communication signal at the output of the first amplification stage, a gain of at least the first amplification stage of the amplifier in the analog front end to track an envelope of the amplitude of the communication signal at the output of the first amplification stage within a first amplitude range.

DETAILED DESCRIPTION

In embodiments described below, a receiver device includes a digital gain control engine that is configured to control gain of one or more amplification stages of an amplifier in an analog front end of the receiver device based on digital samples of the communication signal. In an embodiment, the receiver device includes an analog front end configured to receive a communication signal and to amplify the communication signal using an amplifier that includes one or more amplification stages. The receiver also includes a sampler coupled to an output of a first gain amplification stage among the one or more amplification stages and configured to generate digital samples of the communication signal at the output of the first amplification stage. The digital samples of the communication signal are provided to a digital gain control engine that is configured to generate, based on the digital samples of the communication signal, one or more gain control signals for adjusting respective gains of one or more amplification stages among the one or more amplification stages in the amplifier in the analog front end to track an envelope of an amplitude of the communication signal at the output of the first amplification stage within a particular signal level range. The particular signal level range is determined such that the communication signal at the output of the amplifier does not saturate one or more subsequent components of the receiver device, such as an analog to digital converter that digitizes the communication signal for further processing and demodulation at the receiver device, for example. Because the digital gain control engine operates by tracking the envelope of the amplitude of the communication signal based on digital samples of the communication signal, the digital gain control engine is able to detect amplification peaking that is due to greater amplification of high frequency components of the communication signal relative to lower frequency components of the communication signal, and to reduce the gain of the amplifier in the analog front end accordingly to prevent saturation of the amplifier and/or one or more components ((e.g., the analog to digital converter) of the receiver device that process the communication signal subsequently to the amplifier in the analog front end, in at least some embodiments. Further, because the digital gain control engine operates by tracking the envelope of the amplitude of the communication signal based on digital samples of the communication signal, rather than based on average power of the communication signal, the digital gain control engine is able to detect infrequent peaks in the communication and reduce the gain of the amplifier in the analog front end accordingly such that no saturation of the amplifier and/or the one or more subsequent components (e.g., the analog to digital converter) occurs at the receiver. Thus, tracking the envelope of the amplitude of the communication signal based on digital samples of the communication signal reduces or eliminates bit errors caused by saturation of the digital to analog converter as compared to typical receiver devices that rely on pure analog control of the gain in the analog front end, thus improving the signal to noise ratio of the receiver, without sacrificing the dynamic range of the receiver device, in at least some embodiments.

Figure 1:
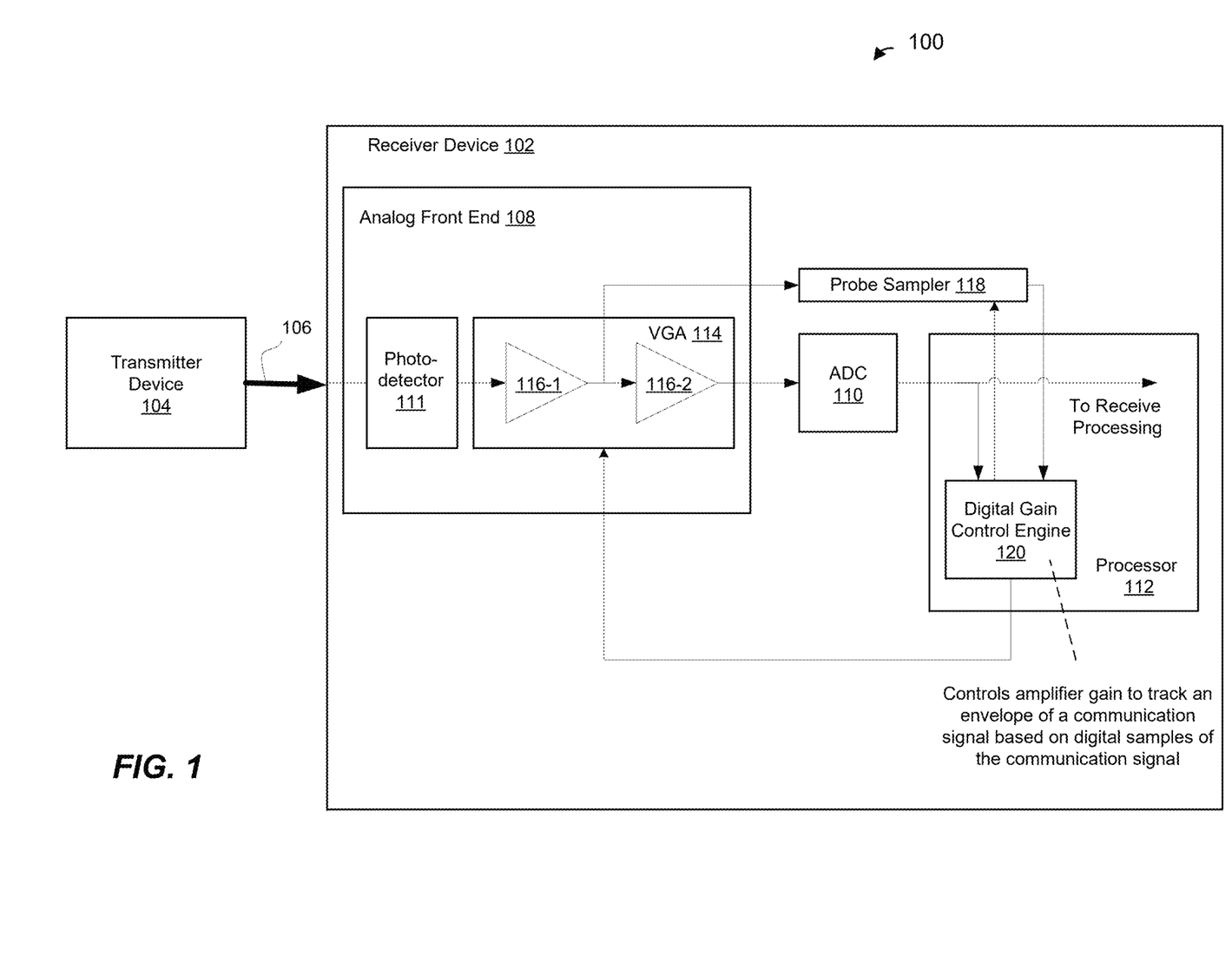
FIG. 1 is a block diagram of an example communication system in which a receiver device is configured to adjust analog front end amplifier gain based on digital samples of the amplified signal, according to an embodiment.

FIG. 1 is a block diagram of an example communication system 100 in which a receiver device 102 is configured to control gain based on digital samples of a received communication signal, according to an embodiment. The communication system 100 includes the receiver device 102 communicatively coupled to a transmitter device 104 via a communication link 106. In an embodiment, the receiver device 102 and the transmitter device 104 are parts of switching or host devices employed in a datacenter, for example for transmission and reception of high-speed data by devices in the datacenter. In other embodiments, the transmitter device 102 and the receiver device 104 are employed in suitable communication networks other than in a datacenter. In an embodiment, the communication link 106 comprises an optical communication link, such as a fiber communication link suitable for transmission of high-speed data. In other embodiments, the communication link 106 comprises other suitable types of communication links, such as other types of optical communication links, wired communication links, wireless communication links, etc.

The receiver device 102 includes an analog front end (AFE) device 108, an analog to digital converter (ADC) 110, and a processor 112. The ADC 110 is configured to generate digital samples of the communication signal. The digital samples of the communication signal are further processed by the processor 112. The processor 112 is a digital signal processor (DSP), for example, in an embodiment. The processor 112 is configured to processes the digital samples of the communication signal, for example to perform digital equalization of the communication signal and to generate on symbols that were transmitted by the transmitter device 104 via the communication signal, in an embodiment. Although the receiver device 102 is generally described herein as a digital receiver that includes the ADC 110 configured to generate digital samples of the communication signal and a processor configured to perform further processing based on the digital samples of the communication signal, the receiver device 102 is an analog receiver device that omits the ADC 110 and processes the communication signal in analog form, in some embodiments.

The analog front end device 108 includes a photodetector 111 and a variable gain amplifier 114, in the illustrated embodiment. The photodetector 111 is configured to receive a light signal from the communication channel 106 and convert the light signal to an electrical signal. For example, the photodetector 111 is configured to covert the light signal to an electrical current signal. The variable gain amplifier 114 is configured to amplify the electrical signal. In an embodiment, the variable gain amplifier 114 is a trans-impedance amplifier (TIA). In another embodiment, the variable gain amplifier 114 is a suitable type of amplifier different from a TIA amplifier. In some embodiments, the AFE device 108 includes one or more additional components configured to improve reception of the communication signals from the communication link 106 and/or condition the communication signals received from the communication link 106 prior to the signal being digitized by the ADC 110. For example, the AFE device 108 includes a tunable termination block configured to minimize reflections at the input to the receiver device 102, a continuous time linear equalizer (CTLE) configured to provide a frequency boost to the input signal, etc., in some embodiments.

The variable gain amplifier 114 includes one or more amplification stages 116. For example, in an embodiment, the variable gain amplifier 114 includes first amplification stage 116-1 and one or more second amplification stage 116-2. In an embodiment, each of the first amplification stage 116-1 and the one or more second amplification stage 116-2 comprises a TIA. In another embodiment, at least one of the first amplification stage 116-1 and the one or more second amplification stage 116-2 comprises a suitable amplifier other than a TIA. In an embodiment, each of the first amplification stage 116-1 and the one or more second amplification stages 116-2 has a variable gain. In an embodiment, the first amplification stage 116-1 is configured to provide a relatively higher amplification gain as compared to the relatively lower amplification gain provided by the one of more second amplification stages 116-2. For example, the first amplification stage 116-1 has a maximum gain of 40 dB or 50 dB, whereas each of the one or more second amplification stages has a maximum gain of 5 dB or 10 dB, in an embodiment. In another embodiment, the variable gain amplifier 114 is a single stage amplifier that includes only a single variable gain amplification stage 116. As an example, in an embodiment in which the receiver device 102 comprises an analog receiver, the variable gain amplifier 114 provides sufficient gain to drive the analog receiver with a single variable gain amplification stage 116. In other examples, in embodiments in which the receiver device 102 is a digital receiver device 102, the variable gain amplifier 114 includes a single amplification stage 116, or in embodiments in which the receiver device 102 is an analog receiver device, the variable gain amplifier 114 includes multiple amplification stages 116.

The receiver device 102 also includes a probe sampler 118 and a digital gain control engine 120. The probe sampler 118 is coupled to an input or an output of a particular amplification stage 116 of the amplifier 114 and is configured to generate digital samples of the communication signal at the input or the output of the particular amplification stage 116 of the amplifier 114. For example, the probe sampler 118 is coupled to an output of the first amplification stage 116-1 and is configured to generate digital samples of the communication signal at the output of the first amplification stage 116-1. In an embodiment, the probe sampler 118 comprises a binary slicer configured to generate digital samples of the communication signal by outputting a logic zero (0) if the value of the communication signal is below a slicing level of the binary slicer and a logic one (1) if the value of the communication signal is above the slicing level of the binary slicer. Using a binary slicer to generate the digital samples of the communication signal allows implementation of the probe sampler 118 that does not interfere or minimally interferes with amplification by the amplifier 114. For example, the probe sampler 118 that comprises a binary slicer does not significantly change a frequency response of the amplifier 114. In another embodiment, however, the probe sampler 118 is configured to generate digital samples of the communication signal in other suitable manners. For example, the probe samples 118 comprises an analog to digital converter (ADC) coupled to an input or an output of a particular amplification stage 116 of the amplifier 114 (e.g., the output of the first amplification stage 116-2 of the amplifier 114) and configured to generate digital samples of the communication signal at the input or the output of the particular amplification stage 116 of the amplifier 114, in an embodiment.

The probe sampler 118 is configured to provide the digital samples of the communication signal to the digital gain control engine 120. The digital gain control engine 120 is configured to process the digital samples of the communication signal obtained from the probe sampler 118 and to generate one or more control signals for adjusting respective gains of one or more amplification stages 116 among the one or more amplification stages 116 of the amplifier 114, and to provide the one or more control signals to the amplifier 114. In an embodiment, the digital gain control engine 120 is configured to generate the one or more control signals for adjusting the gain of the amplifier 114 to ensure that the amplitude of the communication signal at the output of the particular amplification stage remains within a predetermined amplitude range. The predetermined amplitude range at the output of the particular amplification stage 116 is determined such that the communication signal does not saturate one or more components of the receiver device 102 that amplify and/or process the communication signal subsequently to the particular amplification stage 116. For example, the predetermined amplitude range at the output of the particular amplification stage 116 is determined such that the amplitude of the communication signal at the input of the ADC 110 remains at least substantially within the input signal range supported by the ADC 110 and thus, that the communication signal at the input of the ADC 110 does not saturate the ADC 110.

In an embodiment, the digital gain control engine 120 is configured to track an envelope of an amplitude of the communication signal (sometimes referred to herein as simply "envelope of the communication signal") at an output of a particular amplification stage 116 of the amplifier 114 within a particular amplitude range. For example, the digital gain control engine 120 is configured to track an envelope of an amplitude of the communication signal within an amplitude range that ensures that the amplitude of the communication signal at the input of the ADC 110 remains at least substantially within the input signal range supported by the ADC 110. In an embodiment, the envelope of the communication signal is defined by a curve that outlines the low and high extremes of the amplitude of the communication signal. In an embodiment, the digital gain control engine 120 is configured to track the envelope of the communication signal at the output of the particular amplification stage 116 such that the amplitude of the communication signal remains within a particular amplitude rage (e.g., a particular voltage level range) at the output of the particular amplification stage 116. As described in more detail below, in an embodiment, the digital gain control engine 120 is configured to track envelope of the communication signal based on a probability distribution of digital samples of the communication signal generated by the probe sampler 118 at the output of the particular amplification stage 116 such that the that the amplitude of the communication signal remains within a particular amplitude rage (e.g., a particular voltage level range) at the output of the particular amplification stage 116.

In an embodiment, the digital gain control engine 120 is configured to track the envelope of the communication signal at an output of a particular non-final amplification stage 116, such as the first amplification stage 116-1, such that the communication signal at the output of the particular non-final amplification stage stays within an amplitude range that ensures no saturation occurs in one or more subsequent components of the receiver device 102, such as in the one or more following amplification stages 116 and at the ADC 110. In another embodiment, the digital gain control engine 120 is configured to track the envelope of the communication signal at an output of a single amplification stage 116 of a single-stage amplifier 114 such that the communication signal at the output of the single amplification stage 116 stays within an amplitude range that ensures no saturation occurs in one or more subsequent components of the receiver device 102, such as one or more analog components of the receiver device 102. In an embodiment, the digital gain control engine 120 is configured to adjust the gain of the particular amplification stage 116 (e.g., the first amplification state 116-1) of the amplifier 114 to maintain a constant envelope of the communication signal at the output of the first amplification stage 116-1. Maintaining a constant envelope of the communication signal at the output of the first amplification stage 116-1 ensures that no saturation of the subsequent amplification stages occurs even with changes in frequency content of the communication signal and changes in the frequency response of the first amplification stages 116-1, in an embodiment. Because the digital gain control engine 120 controls the gain of the amplifier 114 based on digital samples of the communication signal, rather than a frequency cut-off version of the communication signal, the digital gain control engine 120 is generally responsive to gain changes over the entire frequency range of the communication signal. Moreover, because the digital gain control engine 120 controls the gain of the amplifier 114 based on digital samples of the communication signal, rather than an average power of the communication signal, the digital gain control engine 120 is generally responsive to infrequent peaks in the power of the communication signal.

In an embodiment, the digital gain control engine 120 is configured to generate the one or more control signals based on probability distribution of the digital samples of the communication signal. For example, the digital gain control engine 120 is configured to generate the one or more control signals to track an envelope of the sampled signal to maintain a constant difference between i) a first level that X percent of the digital samples of the amplified communication signal are below and ii) a second level that (100-X) percent of the digital samples of the amplified communication signal are below.

In an embodiment, as illustrated in FIG. 1, the digital gain control engine 120 comprises a digital signal processing (DSP) engine implemented or otherwise included in the processor 120. In another embodiment, the digital gain control engine 120 is implemented in the analog front end 108. For example, the digital gain control engine 120 is implemented on a same chip as the analog front end 108, whereas the processor 112 is implemented on a chip separate from the analog front end 108. In this embodiment, digital control of the gain of the amplifier 114 is provided internally to the analog front end 108. In an embodiment, chip that implements the analog front end 108 and the digital gain control engine 120 and the chip that implements the processor 120 are both packaged in a single device, such as a single receiver device.

In some embodiments, the one or more variable gain stages 116 include or are coupled to one or more analog automatic gain control (AGC) circuits that are configured to automatically control the gain of the one or more variable gain stages 116. The one or more AGC circuits are configured to adjust the gain of the one or more variable gain stages 116 based on an average power of the communication signal. For example, an AGC circuit coupled to an output of an amplification stage 116 includes a non-linearity component, such as a rectifier, and a low pass filter coupled to a comparator and configured adjust the gain of the amplification stage 116 based on comparing the average power (e.g., average voltage) value measured by the non-linearity component and the low pass filter to a reference power (e.g., reference voltage) to drive the average power voltage at the output of the amplification stage 116 towards the reference voltage. As described in more detail below, the one or more analog AGC circuits are configured to initially control the gain of the amplifier 114, for example to determine initial gain upon power-on of the receiver device 102. In some such embodiments, the digital gain control engine 120 is configured to switch gain control from control of the automatic gain control to control of the digital gain control engine 120 after a certain period of time after power-on of the receiver 102. In an embodiment, the digital gain control engine 120 is configured to determine an envelope of the communication signal at the output of the ADC 110 with the gain of the amplifier 114 settled upon by the initial automatic gain control, and, after switching gain control to control of the digital gain control engine 120 to dial in the gain of the amplifier until the envelope of the communication signal at the output of the ADC 110 at least substantially matches the envelope determined with the gain of the amplifier 114 settled upon by the initial automatic gain control. In some cases, the AGC circuits take a shorter period of time to settle upon power-on of the receiver device 102 as compared to a time that it would take the digital gain control engine 120 to determine the initial gain value for the variable gain amplifier 114 upon power-on of the receiver. In other embodiments, however, the receiver device 102 relies on the digital gain control engine 120 to entirely control the gain of the variable gain amplifier 114, including initially adjusting the gain upon power-on of the receiver device 102. In such embodiments, the AGC circuits are omitted from the receiver device 102, or are not used for gain control in the receiver device 102. These and other techniques described herein allow the digital gain control engine 120 to accurately track the level of the communication signal at the input to the ADC 110 within a particular level range that does not saturate the ADC 110 without sacrificing the signal to noise ratio of the receiver device 102, in at least some embodiments.

In various embodiments, because the digital gain control engine 120 operates by tracking the envelope of the communication signal based on digital samples of the communication signal generated by the probe sampler 118, the digital gain control engine 120 is able to detect amplification peaking that is due to greater amplification of high frequency components of the communication signal relative to lower frequency components of the communication signal and to accordingly adjust (i.e., decrease) the gain of the amplifier 114 to prevent saturation at the higher frequencies of the communication signal, in an embodiment. Further, because the digital gain control engine 120 operates by tracking the envelope of the communication signal based on digital samples of the communication signal generated by the probe sampler 118, rather than based on average power of the communication signal, the digital gain control engine 120 is able to detect infrequent peaks in the communication and reduce the gain accordingly to prevent saturation. Thus, by tracking the envelope of the communication signal based on digital samples of the communication signal, the digital gain control engine 120 ensures that bit errors, that are due to saturation in receivers that rely on pure analog control of the gain in the analog front end, are reduced or eliminated in the receiver device 102, thus improving the signal to noise ratio of the receiver, without sacrificing the dynamic range of the receiver, in at least some embodiments.

Figure 2A:
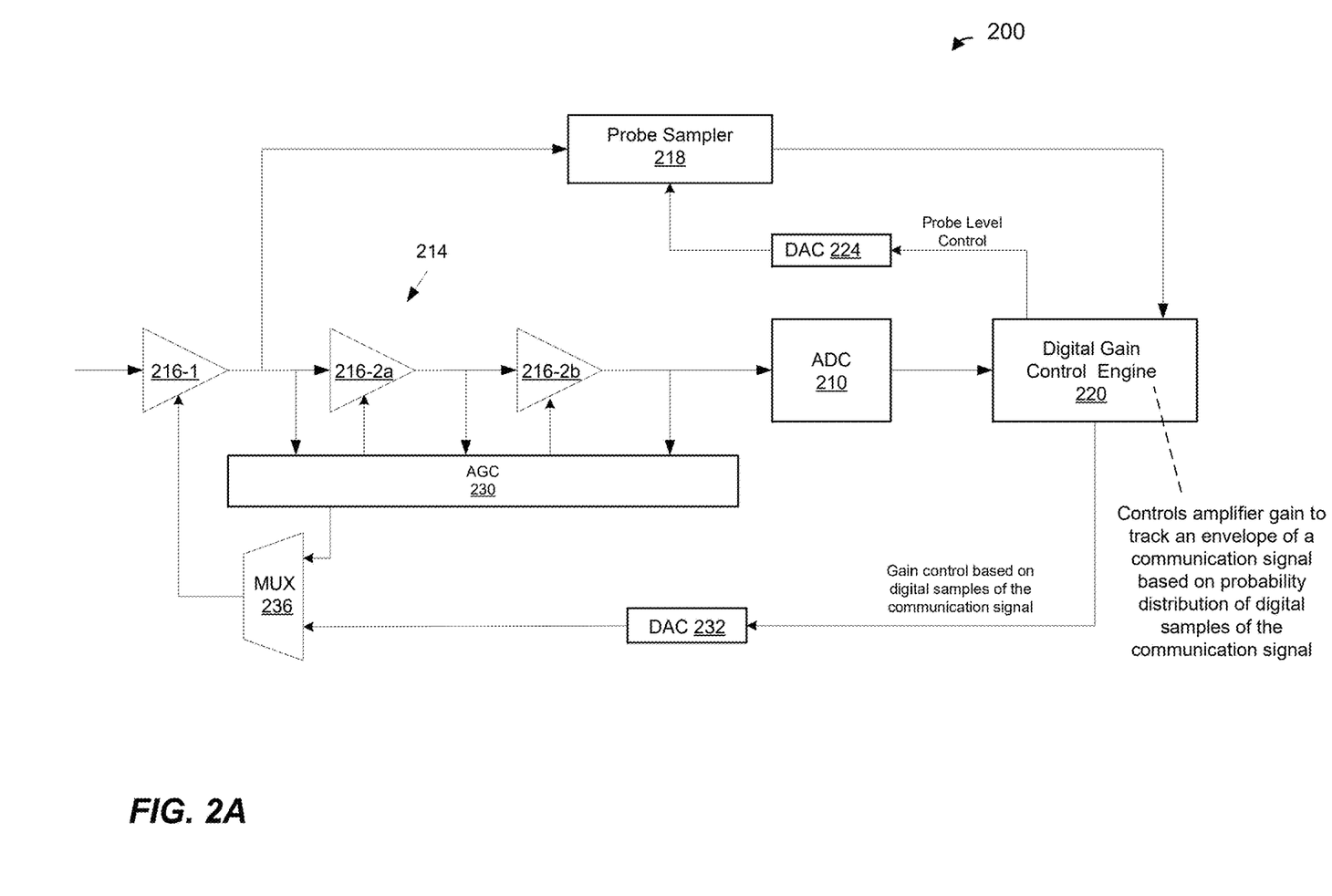
FIG. 2A is a block diagram an analog front end and a digital gain control engine of the receiver device of FIG. 1, according to an embodiment.

FIG. 2A is a block diagram of a receiver device 200, according to an embodiment. In an embodiment, the receiver device 200 corresponds to the receiver device 102 of FIG. 1, and the receiver device 200 is described with reference to FIG. 1 for ease of explanation. In other embodiments, the receiver device 200 is utilized with communication systems different from the communication system 100 of FIG. 1. Similarly, the receiver device 102 of the communication system 100 of FIG. 1 is different from the receiver device 200, in some embodiments. The receiver device 200 includes like-numbered elements with the receiver device 102 of FIG. 1 which are not described in detail for brevity.

The receiver device 200 includes an amplifier 214 corresponding to the amplifier 114 of FIG. 1. The amplifier 214 includes one or more amplification stages 216 corresponding to the one or more amplification stages 116 of the amplifier 114 of FIG. 1. The one or more amplification stages 216 includes a first amplification stage 216-1 corresponding to the first amplification stage 116-1 of the amplifier 114 of FIG. 1 and two second amplification stages 216-2a, 216-2b corresponding to the one or more second amplification stages 116-2 of the amplifier 114 of FIG. 1. The receiver device 200 also includes an ADC 210 corresponding to the ADC 110 of FIG. 1, a probe sampler 218 corresponding to the probe sampler 118 of FIG. 1, and a digital gain control engine 220 corresponding to the digital gain control engine 120 of FIG. 1.

The receiver device 200 also includes an AGC circuit 230. The AGC circuit 230 comprises one or more analog circuits configured to automatically adjust respective gains of the one or more amplification stages 216 based on average power of the communication signal, in an embodiment. For example, the AGC circuit 230 is configured to control gain of respective gains of the one or more amplification stages 216 based on comparing respective average voltage levels of the communication signal at respective outputs of the respective gains of the one or more amplification stages 216 to respective predetermined reference voltage levels. Although the AGC circuit 230 is illustrated in FIG. 2 as a single AGC circuit 230, the receiver device 200 includes respective AGC circuits 230 coupled to outputs of respective amplification stages 216 and configured to independently control gains of the respective amplification stages 216, in some embodiments. The AGC circuit 230 coupled to an output of an amplification stage 216 generally includes a non-linearity component, such as a rectifier, and a low pass filter coupled to a comparator and configured adjust the gain of the amplification stage 216 based on comparing the average power (e.g., average voltage) value measured by the non-linearity component and the low pass filter to a reference power (e.g., reference voltage) to drive the average power voltage at the output of the amplification stage 216 towards the reference voltage.

The digital gain control engine 220 is coupled to gain control input of at least one of the amplification stages 216 via at least one digital to analog converter (DAC) 232 and is configured to control gain of the at least one of the amplification stages 216 via at least one DAC 232. For example, in an embodiment, the digital gain control engine 220 is configured to digitally adjust the gain of the first amplification stage 216-1 via the DAC 232 during reception of a communication signal by the receiver device 200, while allowing the remaining amplification stages 216-2a, 216-2b to be controlled by the AGC circuit 230 throughout reception of the communication signal by the receiver device 200. Controlling the gain of the first amplification stage 216-1 by the digital gain control engine 220 during reception of the communication signal by the receiver device 200, while keeping the remaining amplification stages 216 under gain control of the AGC 230 throughout operation of the receiver device 200, allows the digital gain control engine 220 to adjust the gain of the of the first amplification stage 216-1 to account for signal peaking and frequency fluctuations caused by changes in signal content and temperature changes, while letting relatively quicker fine power adjustments to be performed by the remaining amplification stages 216 under gain control of the AGC 230. However, although the digital gain control engine 220 is generally described herein as controlling gain of the first amplification stage 216-1 while allowing the gain of the remaining amplification stages 216 to be controlled by the AGC circuit 230 throughout operation of the receiver device 200, the digital gain control engine 220 is configured to control gain of one or more other amplification stages 216 in addition to, or instead of, the first amplification stage 216-1, in other embodiments.

The receiver device 200 includes a multiplexer (MUX) 236 configured to selectively couple the output of the AGC circuit 230 or the output of the DAC 232 to a control input of the first amplification stage 216-1, in an embodiment. The digital gain control engine 220 is configured to initially control the MUX 236 to provide the output of the AGC circuit 230 to the control input of the first amplification stage 216-1 so that the gain of the first amplification stage 216-1 is initially controlled by the analog circuit of the AGC 230 circuit, in an embodiment. Initially controlling the gain of the first amplification stage 216-1 by the AGC circuit 230 allows for the overall gain of the amplifier 214, including the gain of the first amplification stage 216-1, to be relatively quickly set by the AGC circuit 230 upon power-on of the receiver device 200. The digital gain control engine 220 is configured to, after allowing the AGC gain loop to settle after power-on of the receiver, control the MUX 236 to cut gain control of the first amplification stage 216-1 from the AGC 230 and to switch the gain control of the first amplification stage 216 to control of the digital gain control engine 220. The digital gain control engine 220 is configured to measure or otherwise determine an envelope of the communication signal at the output of the ADC 210 with the gain of the amplifier 214 initially set to the AGC circuit 230. For example, the digital gain control engine 220 comprises a percentile engine configured to determine the envelope of the communication signal based on a distribution of digital samples of the communication signal generated by the ADC 210. For example, as described in more derail below, the percentile engine of the digital gain control engine 220 is configured to determine a first ADC code corresponding to a signal level $T_{lo}$ of which X percent of the digital samples of the communication signal at the output of the ADC 210 are below and a second ADC code corresponding to a signal level $T_{hi}$ of which (100-X) percent of the digital samples of the communication signal at the output of the ADC 210 are below.

In an embodiment, the digital gain control engine 220 is configured to, upon determining the envelope of the communication signal with the gain of the amplifier 214, control the MUX 236 to switch gain control of the first amplification 216-1 to control by the control of the digital gain control engine 220, while keeping the remaining amplification stages 216 under gain control of the AGC 230. As discussed above, switching control of the first amplification stage 216-1 to the control of the digital gain control engine 220, while keeping the remaining amplification stages 216 under gain control of the AGC 230, allows the digital gain control engine 220 to adjust the gain of the first amplification stage 216-1 to account for signal peaking and frequency fluctuations caused by changes in signal content and temperature changes, while allowing relatively quicker fine power adjustments to be performed by the remaining amplification stages 216 under gain control of the AGC 230. However, although the digital gain control engine 220 is generally described herein as being configured to switch control of the first amplification stage 216-1 to control of the digital gain control engine 220, while allowing the gain of the remaining amplification stages 216 to be controlled by the AGC circuit 230 throughout operation of the receiver device 200, the digital gain control engine 220 is configured to switch control of gain of one or more other amplification stages 216, in addition to or instead of the first amplification stage 216-1, to control of the digital gain control engine 220, in other embodiments.

In an embodiment, when switching the gain control of the first amplification stage 216-1 to control of the digital gain control engine 220, the digital gain control engine 220 initially sets the gain of the first amplification stages 216-1 to the maximum gain of the first amplification stages 216-1. The digital gain control engine 220 is configured to then dial down the gain of the first amplification stage 216-1, while measuring the envelope of the communication signal at the output of the ADC 210 as described above, until the envelope of the communication signal matches the envelope measured with the gain set by the AGC circuit 230, in an embodiment. In at least some embodiments, switching the gain control from analog to digital control in this manner allows for the gain control switched without glitching and/or without signal loss by the receiver 200.

With the digital gain initially set by the digital gain control engine 220 via the DAC 232, the digital gain control engine 220 determines the ADC output level (e.g., ADC output code corresponding to the ADC output level) at which the desired distribution of the digital samples generated by the ADC is achieved. In an embodiment, the digital gain control engine 220 determines the ADC level by adaptively adjusting the ADC code $D_{percent}$. For example, the digital gain control engine 220 determines a $SUM_{hi}$ value by counting the number of ADC samples that are above the ADC code $D_{percent}$ according to $$SUM_{hi} = \sum_{n=-0}^{M-1} \delta(ADC_{VAL[n]} > D_{percent}) \quad \text{Equation 1}$$

where, given the sampled ADC frame of M samples, $ADC_{VAL}[n]$, n=0, 1 . . . , M−1 is the value of the sample n.

The digital gain control engine 220 also determines a $SUM_{lo}$ value according to $$SUM_{lo} = M - SUM_{hi} \quad \text{Equation 2}$$

and adjusts $D_{percent}$ according to $$D_{percent}[n+1] = D_{percent}[n] + mu*((P_{desired}*SUM_{hi}) - ((100 - P_{desired})*SUM_{lo})) \quad \text{Equation 3}$$

such that the $D_{percent}$ value corresponds to the ADC code at which $P_{desired}*SUM_{hi}$ is at least substantially equal to $(100 - P_{desired})*SUM_{lo}$.

In some embodiments, the digital gain control engine 220 is configured to determine a first $D_{percent}$ value corresponding to a $T_{hi}$, where X precent of the digital samples at the output of the ADC 210 are below $T_{hi}$ and a second $D_{percent}$ value corresponding to a $T_{lo}$, where 100-X precent of the digital samples at the output of the ADC 210 are below $T_{lo}$. The digital gain control engine 220 is configured to adjust the gain of the amplification stage 216-1 during reception of the communication signal by the receiver device 200 such that the envelope of the communication signal at the output of the ADC 210 is maintained within the envelope given by $$\Delta = T_{hi} - T_{lo} \quad \text{Equation 4}$$

where Δ is the envelope of the communication signal, $T_{hi}$ is the ADC output level (e.g., the ADC code) corresponding to the first $D_{percent}$ value and $T_{lo}$ is the ADC output level (e.g., the ADC code) corresponding to the second $D_{percent}$ value.

In an embodiment, the digital gain control engine 220 is configured to control the gain of the amplification stage 116-1 based on monitoring probability distribution of the digital samples generated by the probe sampler 218. For example, the digital gain control engine 220 is configured to control the gain of the amplification stage 116-1 such that not more than X percent (e.g., 0.1%, 0.5%, 1%, 2%, etc.) of the digital samples generated by the probe sampler 218 correspond to the amplitude of the communication signal at the output of the first amplification stage 116-1 being above the level $T_{hi}$ and, in some embodiments, below the level $T_{lo}$, measured by the digital gain control engine 220 as described in more detail below based on probability distribution of the digital samples generated by the probe sampler 218 as the slicing level of the probe sampler 218 is swept by the digital gain control engine 220. In an embodiment, the digital gain control engine 220 controls the gain of the amplification stage 116-1 based on monitoring probability distribution of the digital samples of the communication signal at the output of the probe sampler 218 such that the probability distribution of the digital samples of the communication signal at the output of probe sampler 218 matches the desired probability distribution at the output of the ADC 210, for example.

In an embodiment in which the probe sampler 218 comprises a binary slicer, the digital gain control engine 220 determines a slicing level at which the digital samples of the communication signal are distributed such that X percent of the samples are digital one (1) indicating that the level of the sampled communication signal is above the slicing level of the binary slicer. The digital gain control engine 220 provides a control signal to the DAC 224 to generate the determined slicing level for the probe sampler 218.

After providing the determined DAC code to the DAC 224 to generate the corresponding slicing level for the probe sampler 218, the digital gain control engine 220 monitors the output of the probe sampler 218 and adjusts the gain of the amplification stage 116-1 as needed to maintain the distribution of the digital samples of the communication signal at the output of the binary slicer such that X percent of the samples are digital one (1) indicating that the level of the sampled communication signal is above the slicing level of the binary slicer. Thus, if the percentage of the sampled communication signal that are above the slicing level of the binary slicer increases above X percent, the digital gain control engine 220 reduces the gain of the first amplification gain 116-1 to bring the percentage of the sampled communication signal that are above the slicing level of the binary slicer back closer to X percent. On the other hand, if the percentage of the sampled communication signal that are above the slicing level of the binary slicer falls below X percent, the digital gain control engine 220 increases the gain of the first amplification gain 116-1 to bring the percentage of the sampled communication signal that are above the slicing level of the binary slicer back closer to X percent.

In an embodiment, the digital gain control engine 220 is further configured to, prior to controlling the gain of the at least first amplification stage, determine that the communication signal comprises a data signal and not a purely noise signal based on determining that a number of digital samples of the communication signal generated by the binary slicer exceeds a predetermined threshold. For example, the digital gain control engine 220 is further configured to, prior to controlling the gain of the at least first amplification stage, determine that the communication signal comprises a data signal and not a purely noise signal based on determining that at least X precent of the number of digital samples of the communication signal generated by the probe slicer 218 are logic ones (1).

In an embodiment, the digital gain control engine 220 monitors the output of the probe sampler 218 according to $$SUM = \sum_{n=0}^{M-1} \delta(\text{Probe} > T_{hi}) \quad \text{Equation 5}$$

where, given the sampled probe frame of M samples, each sample n has the of value Probe [n], n=0, 1 . . . , M−1. The digital gain control engine 220 determines a new code for the DAC 232 Zt[n+1] based on the current code Zn[n] provided to the DAC 232 the gain of the amplification stage 116-1 according to $$Zt[n+1] = Zn[n] + mu*(SUM - P_{desired}) \quad \text{Equation 6}$$

The digital gain control engine 220 then provides the new code Zt[n+1] to the DAC 232 to adjust the gain of the first amplification stage 116-1. The digital gain control engine 220 thus continues to monitor the output of the binary slicer according to Equation 4 and adjusting the code provided to the DAC 232 and according to Equation 5 adjust the gain of the first amplification stage 116-1 as needed throughout reception of the communication signal such that at least substantially constant envelope $\Delta=T_{hi}-T_{lo}$ as given by Equation 4 is maintained at the output of the ADC 210, in embodiment.

In an embodiment, when the digital gain control engine 220 switches gain control of the first amplification stage 216-1 to the control of the digital gain control engine 220, the digital gain control engine 220 initially sets the gain of the at least one of the amplification stages 216 to the maximum gain of the particular application stage 216 of the amplification stages 216 (e.g., the first amplification stage 216-1) by providing, to the DAC 234, a DAC code corresponding to the maximum gain of the particular application stage 216. The digital gain control engine 220 then dials down the gain of the first amplification stage 216 while continually measuring the envelope of the communication signal at the output of the ADC 210 until the envelope of the of the communication signal at the output of the ADC 210 with the digitally controlled gain of the first amplification stage 216-1 at least substantially equals the envelope of the of the first amplification stage 216-1 set by the AGC 230.

With the dialed-down gain of the first amplification stage 216-1 set by the digital gain control engine 220, the digital gain control engine 220 measures the envelope of the communication signal at the output of the probe sampler 218, in an embodiment. The digital gain control engine 220 then controls the gain of the first amplification stage 216-1 based on digital samples generated by the probe sampler 218 to track the envelope of the communication signal at the output of the probe sampler 218 at the level measured by the digital gain control engine 220. In an embodiment, the digital gain control engine 220 measures the envelope of the communication signal at the output of the probe sampler 218 by sweeping the slicing level of the probe sampler 218 across a range of the DAC 224 to find a DAC code corresponding to a first slicing level $T_{hi}$ of which X percent of the digital samples (e.g., ADC codes corresponding to the digital samples) of the communication signal at the output of the ADC 210 are below and a second DAC code corresponding to a signal level $T_{hi}$ of which (100-X) percent of the digital samples (e.g., ADC codes corresponding to the digital samples) of the communication signal at the output of the ADC 210 are below. In an embodiment, the value of X is preset or otherwise predetermined in the receiver device 200. For example, the value of X is preset to 0.1%, 0.5%, 1%, 2%, or another suitable percentage value. In another embodiment, the value of X is a percentage value that is configurable in the receiver device 200. The digital gain control engine 220 then sets the slicing level to the determined value and adjusts the gain of the first amplification stage 116-1 so that the percentage of samples that are below the determined level remains at least substantially constant, in an embodiment.

In another embodiment, in which low frequency content of the communication signal is not sufficiently low, for example if the output of the first amplification stage 216 is not AC-coupled to the probe sampler 218, the digital gain control engine 220 is configured to determine a first DAC code corresponding to a signal level $T_{hi}$ of which (100-X) percent of the digital samples of the communication signal at the output of the ADC 210 are below and a second DAC code corresponding to a signal level $T_{lo}$ of which X percent of the digital samples of the communication signal at the output of the ADC 210 are below, and to track the envelope $\Delta=T_{hi}-T_{lo}$ as given by Equation 4 is maintained at the output of the ADC 210, in embodiment.

Figure 2B:
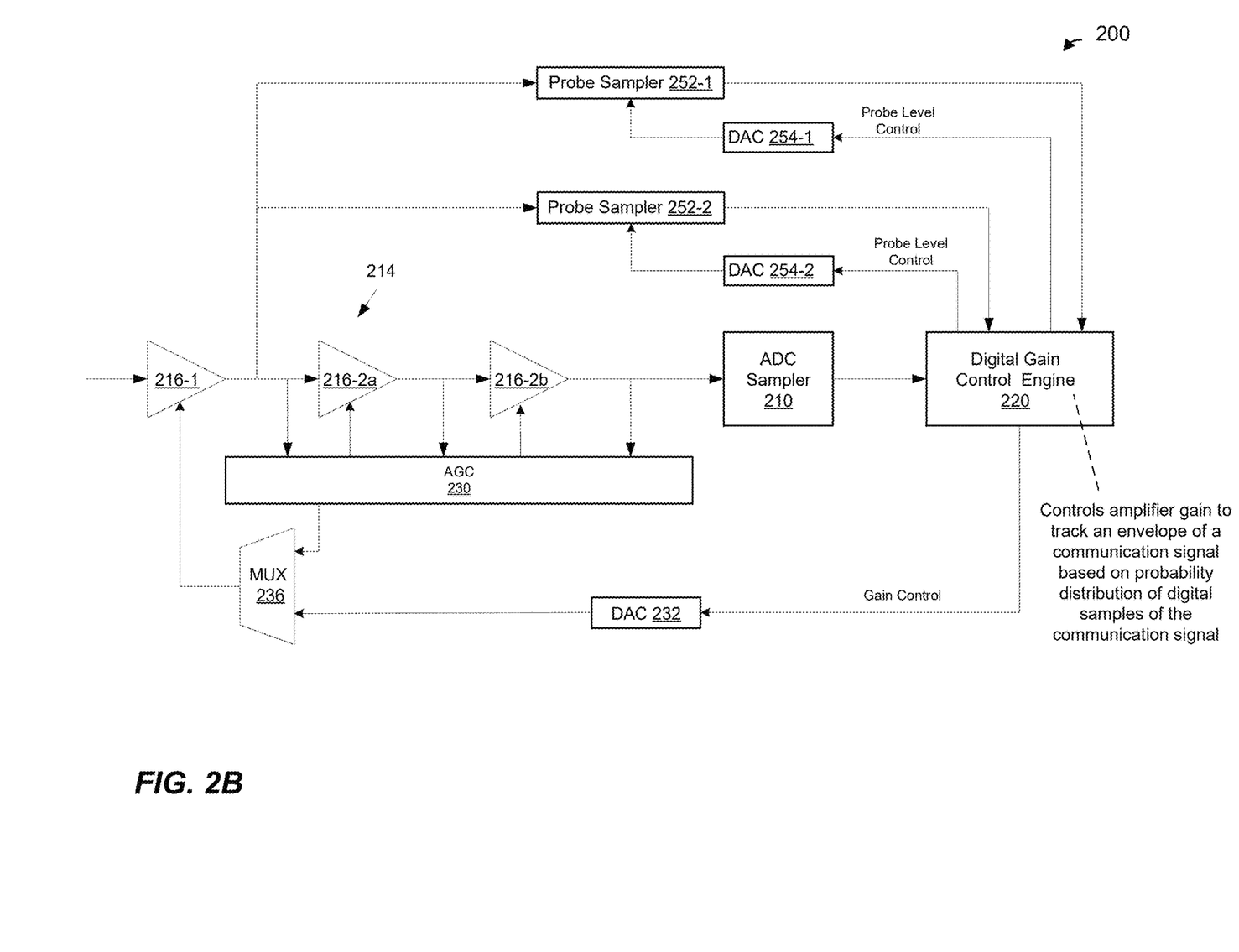
FIG. 2B is a block diagram an analog front end and a digital gain control engine of the receiver device of FIG. 1, according to another embodiment.

Referring briefly to FIG. 2B, a communication device 250 is generally the same as the communication device 200 of FIG. 2A, except that the communication device 250 includes a first probe sampler 252-1 and a second probe sampler 252-2 coupled to the output of the first amplification stage 216-1. Each of the first probe sampler 252-1 and the second probe sampler 252-2 is generally the same as the probe sampler 218 of FIG. 2A, in an embodiment. Each of the first probe sampler 252-1 and the second probe sampler 252-2 comprises a binary slicer, in an embodiment. The first probe sampler 252-1 is configured to monitor a signal level Tu of which (100-X) percent of the digital samples of the communication signal generated are below and the second probe sampler 252-2 is configured to monitor a signal level $T_{lo}$ of which X percent of the digital samples of the communication signal at the output of the ADC 210 are below. In an embodiment, the digital gain control engine 220 is configured to sweep digital codes provided to a first DAC 254-1 that sets the slicing level of the first probe sampler 252-1 to determine the DAC code corresponding to $T_{hi}$ of which (100-X) percent of the digital samples of the communication signal at the output of the ADC 210 are below. The digital gain control engine 220 is also configured to sweep digital codes provided to a second DAC 254-2 that sets the slicing level of the first probe sampler 252-2 to determine the DAC code corresponding to $T_{lo}$ of which X percent of the digital samples of the communication signal at the output of the ADC 210 are below. The digital gain control engine 220 then sets the slicing levels of the first probe sample 252-1 and the second probe sampler 252-2 by setting the DAC codes provided to the DACs 254-1, 254-1 to the determined DAC codes. With the set slicing levels of the first probe sample 252-1 and the second probe sampler 252-1, the digital gain control engine 220 monitors the digital samples of the communication signal at the output of each of the first probe sample 252-1 and the second probe sampler 252-2 and adjusts the gain of the amplifier 214 (e.g., the first amplification stage 216-1 of the amplifier 214) as needed to track a constant envelope of the communication signal between $T_{lo}$ and $T_{hi}$, in an embodiment. For example, the digital gain control engine 220 increases the gain of the amplifier 114 when the value of $T_{hi}-T_{lo}$ corresponding to the digital samples generated by the first probe sample 252-1 and the second probe sampler 252-2 is greater than a predetermined hysteresis HYST value and reduces the gain of the amplifier 114 when the value of $T_{hi}-T_{lo}$ corresponding to the digital samples generated by the first probe sample 252-1 and the second probe sampler 252-2 is less than negative HYST, in an embodiment.

Figure 3A:
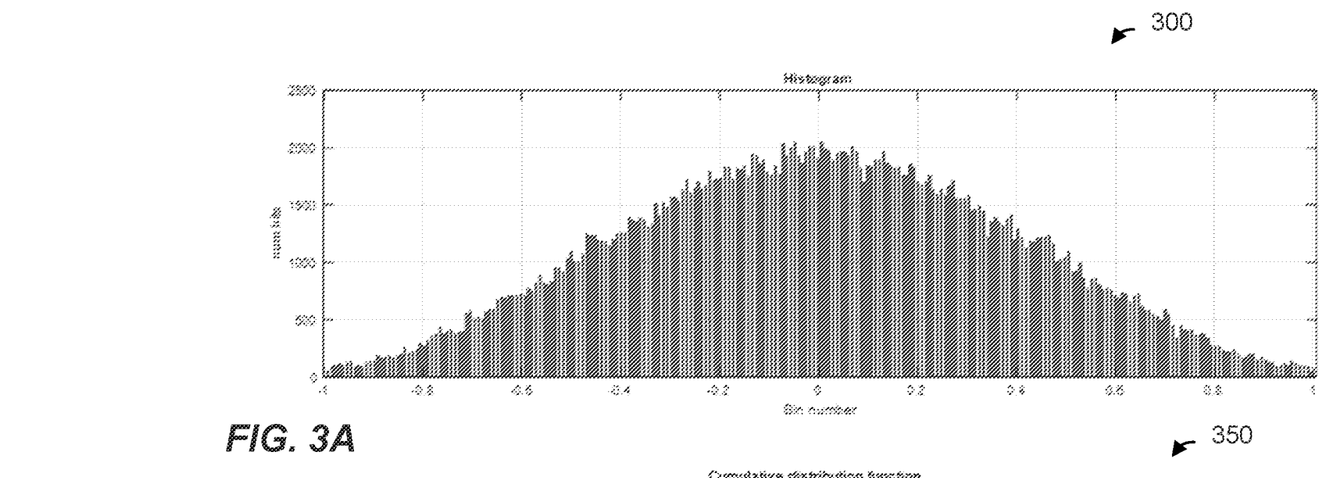
FIG. 3A is a diagram of a histogram generated by the digital gain control engine of FIG. 1, according to an embodiment.

FIG. 3A is a diagram of a histogram 300 showing distribution of digital samples of the communication signal measured at the output of the ADC 110, according to an embodiment. The bin numbers on the x-axis correspond to ADC codes, in an embodiment. The bin numbers are normalized to show distribution of the digital samples around a signal level of which 50% of the digital samples are below and 50% of the samples are above. The values on the y-axis corresponds a number of digital samples that fall in each of the bins. In an embodiment, the digital gain control engine 120 is configured to track the envelope of the communication signal at the output of the ADC 110 between $T_{lo}$ and $T_{hi}$ as described above such that (100-X) percent of the digital samples in the histogram 300 fall below $T_{lo}$ and X percent of the digital samples in the histogram 300 fall below $T_{hi}$.

Figure 3B:
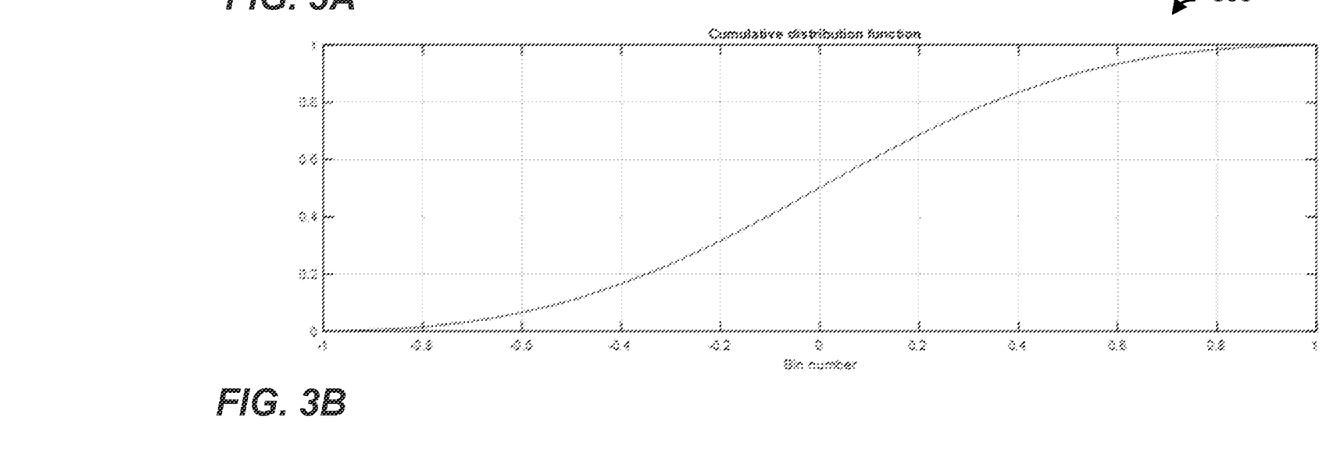
FIG. 3B is a diagram of a cumulative distribution function corresponding to the histogram of FIG. 3A, according to an embodiment.

FIG. 3B is a diagram of a cumulative distribution function 350 corresponding to the histogram of FIG. 4A, according to an embodiment. The cumulative distribution function 350 shows the probability corresponding to each bin that the digital samples of the communication signal at the output of the ADC 110 will be below the bin. The digital gain control engine 120 is thus configured to track the envelope of the communication signal at the output of the ADC 110 between $T_{lo}$ and $T_{hi}$ as described above based on the probability distribution function 350 such that (100-X) percent of the digital samples fall below a bin corresponding to $T_{lo}$ and X percent of the digital samples fall below a bin corresponding to $T_{hi}$ as indicated by the probability distribution function 350, in an embodiment.

Figure 4:
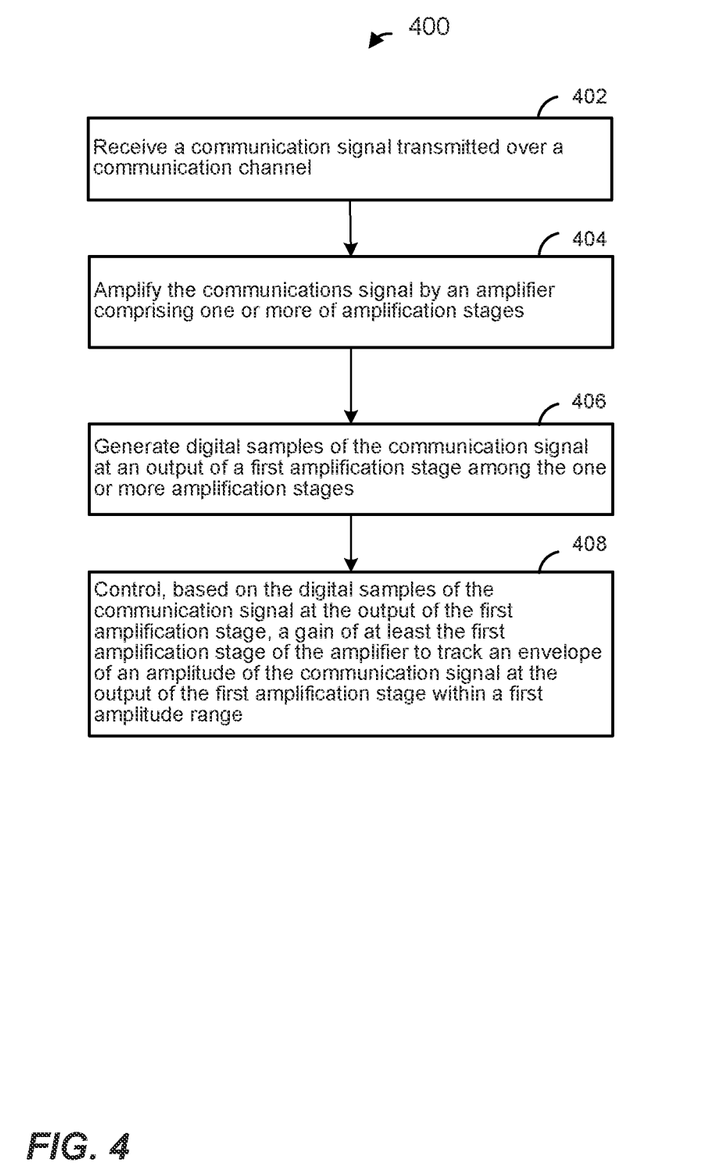
FIG. 4 is a flow diagram illustrating an example method for controlling input gain in a receiver device, according to an embodiment.

FIG. 4 is a flow diagram illustrating an example method 400 for controlling input gain in a receiver device, according to an embodiment. In an embodiment, the method 500 is implemented by the receiver device 102 of FIG. 1. For ease of explanation, the method 700 is generally described with reference to the receiver device 102 of FIG. 1.

At block 402, a communication signal is received at an analog front end of the received device. In an embodiment, the communication signal is received by the analog front end 108 of FIG. 1. In other embodiments, the communication signal is received by suitable analog front end devices different from the analog front end 108 of FIG. 1. In an embodiment, the communication signal is a communication signal transmitted over a communication channel from a transmitter device to the receiver device. In an embodiment, the communication signal is an optical communication signal transmitted over a fiber communication channel from the transmitter device to the receiver device. In another embodiment, the communication signal is a suitable type of communication signal different from an optical communication signal and/or is transmitted over a suitable communication channel different from a fiber communication channel.

At block 404, the communication signal is amplified by an amplifier in the analog front end of the receiver device. In an embodiment, the communication signal is amplified by the amplifier 114 of FIG. 1 or is amplified by a suitable amplifier different from the amplifier 114 of FIG. 1. In an embodiment, the amplifier comprises one or more amplification stages. For example, amplifier comprises the amplification stage 116-1 and the amplification stage 116-2 in FIG. 1. In another embodiment, the amplifier comprises only a single amplification stage.

At block 406, digital samples of the communication signal at an output of a first amplification stage among the one or more amplification stages are generated by a sampler included in the receiver device. In an embodiment, the first amplification stage is a non-final amplification stage of the amplifier of the receiver device. For example, the digital samples correspond to digital samples generated by the probe sampler 122 based on the communication signal at the output of the first stage 116-1 of the amplifier 114 in FIG. 1. In another embodiment, the first amplification stage is a final amplification stage of the amplifier of the receiver device. For example, the digital samples correspond to digital samples generated by the ADC 110

At block 408, gain of at least the first amplification stage of the amplifier in the analog front end is controlled based on the digital samples of the communication signal at the output of the first amplification stage to track an envelope of an amplitude of the communication signal at the output of the first amplification stage within a first amplitude range. In an embodiment, the gain of the at least the first amplification stage is controlled by the digital gain control engine 120 of FIG. 1. In another embodiment, the gain of the at least the first amplification stage is controlled by a suitable digital gain control engine different from the digital gain control engine 120 of FIG. 1. The particular signal level range is determined such that the communication signal at the output of the amplifier does not saturate an analog to digital converter that digitizes the communication signal for further processing and demodulation at the receiver, in an embodiment. Because the digital gain control engine operates by tracking the envelope of the communication signal based on digital samples of the communication signal, the digital gain control engine detects amplification peaking that is due to greater amplification of high frequency components of the communication signal relative to lower frequency components of the communication signal, in an embodiment. Further, because the digital gain control engine operates by tracking the envelope of the communication signal based on digital samples of the communication signal, rather than average power of the communication signal, the digital gain control engine detects infrequent peaks in the communication and reduces the gain accordingly such that no saturation of the analog to digital converter occurs at the receiver device. Thus, tracking the envelope of the communication signal based on digital samples of the communication signal reduces or eliminates bit errors caused by saturation of the digital to analog converter in receivers that rely on pure analog control of the gain in the analog front end, thus improving the signal to noise ratio of the receiver, without sacrificing the dynamic range of the receiver, in at least some embodiments.

At least some of the various blocks, operations, and techniques described above are suitably implemented utilizing dedicated hardware, such as one or more of discrete components, an integrated circuit, an application-specific integrated circuit (ASIC), a programmable logic device (PLD), a processor executing firmware instructions, a processor executing software instructions, or any combination thereof. When implemented utilizing a processor executing software or firmware instructions, the software or firmware instructions may be stored in any suitable computer readable memory such as on a magnetic disk, an optical disk, or other storage medium, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A receiver device, comprising:
    an analog front end configured to receive a communication signal transmitted over a communication channel, the analog front end including an amplifier comprising a plurality of amplification stages configured to amplify the communication signal, the plurality of amplification stages including a first non-final amplification stage and a final amplification stage;
    an analog to digital converter having an input coupled to an output of the final amplification stage, the analog to digital converter configured to generate first digital samples of the communication signal at the input to the analog to digital converter for further demodulation by the receiver device;

a sampler coupled to an output of the first non-final amplification stage among the plurality of amplification stages, the sampler configured to generate second digital samples of the communication signal at the output of the first non-final amplification stage; and a digital gain control engine configured to control, using i) the first digital samples of the communication signal output by the analog to digital converter and ii) the second digital samples of the communication signal at the output of the first amplification stage, a gain of at least the first non-final amplification stage of the amplifier in the analog front end to track an envelope of an amplitude the communication signal at the output of the first non-final amplification stage within a first amplitude range.

2. The receiver device of claim 1, wherein the digital gain control engine is configured to control the gain of the at least the first non-final amplification stage of the amplifier to further track an envelope of the amplitude the communication signal at an output of the analog to digital converter within a second amplitude range different from the first amplitude range.

3. The receiver device of claim 2, wherein the digital gain control engine is configured to control the gain of the at least the first non-final amplification stage of the amplifier based on a probability distribution of the second digital samples of the communication signal at an output of the sampler.

4. The receiver device of claim 3, wherein the digital gain control engine is configured to control the gain of the at least the first non-final amplification stage to maintain a constant difference between i) a first signal level that X percent of the first digital samples of the communication signal are below and ii) a second signal level that (100-X) percent of the first digital samples of the communication signal are below.

5. The receiver device of claim 3, wherein:

the sampler comprises a binary slicer, and the digital gain control engine is configured to:

set a slicing level of the binary slicer such that X percent of digital samples generated by the binary slicer are logic 1 and (100-X) percent of the digital samples generated by the binary slicer are logic 0, track the envelope of the amplitude of the communication signal at the output of the first non-final amplification stage by i) reducing the gain of the first non-final amplification stage in response to determining that a percentage of digital samples generated by the binary slicer are logic 1 is greater than X and ii) i) increasing the gain of the first non-final amplification stage in response to determining that the percentage of digital samples generated by the binary slicer are logic 1 is less than X.

6. The receiver device of claim 5, wherein the digital gain control engine is configured to set the gain of the first non-final amplification stage to an initial gain value such the envelope of the amplitude of the communication signal at the output of the analog to digital converter is initially within the second amplitude range, determine the slicing level of the binary slicer with the gain of the first non-final amplification stage to the initial gain value, set the slicing level of the binary slicer to the determined slicing level, and track the envelope of the amplitude of the communication signal at the output of the first non-final amplification stage based on monitoring the output of the binary slicer with the slicing level maintained at the determined slicing level.

7. The receiver device of claim 6, wherein the digital gain control engine is further configured to, prior to controlling the gain of the at least the first non-final amplification stage, determine that the communication signal comprises a data signal and not a purely noise signal based on determining that a number of digital samples of the communication signal generated by the binary slicer exceeds a predetermined threshold.

8. The receiver device of claim 2, further comprising an analog automatic gain control circuit configured to perform automatic gain control of the plurality of gain amplification stages upon power-on of the receiver device.

9. The receiver device of claim 8, wherein the digital gain control engine is configured to switch gain control of the first non-final amplification stage from control of the analog automatic gain control circuit to control of the digital gain control engine while maintaining control of a remaining one of more amplification stages among the plurality of amplification stages under control of the analog automatic gain control circuit to provide fine tuning of power of the communication signal after the first non-final amplification stage.

10. The receiver device of claim 9, wherein the digital gain control engine is configured to prior to switching gain control of the first non-final amplification stage from control of the analog automatic gain control circuit to control of the digital gain control engine, measure an envelope of the amplitude of the communication signal with the gain of the first non-final amplification stage set by the analog automatic gain control circuit, and when switching gain control of the first non-final amplification stage from control of the analog automatic gain control circuit to control of the digital gain control engine:

initially set the gain of the first non-final amplification stage to a maximum gain value, and dial down the gain of the first non-final amplification stage while measuring the envelope of the amplitude communication signal until the envelope of the amplitude of the communication signal with the gain of the first non-final amplification stage set by the digital gain control engine matches the measured envelope of the amplitude of the communication signal with the gain of the first non-final amplification stage set by the analog automatic gain control circuit.

11. The receiver device of claim 1, wherein the communication signal transmitted over the communication channel is an optical signal, the analog front end further includes a photodetector configured to convert the optical signal to an electrical signal, the plurality of amplification stages are configured to amplify the electrical signal, the sampler is configured to generate the second digital samples of the communication signal at the output of the first non-final amplification stage by generating digital samples of the electrical signal at the output of the first non-final amplification stage, and the digital gain control engine is configured to control the gain of the at least the first amplification stage using the digital samples generated based on the electrical signal at the output of the first amplification stage.

12. The receiver device of claim 1, wherein the digital gain control engine includes a percentile engine implemented by a digital signal processor, wherein the percentile engine is configured track the envelope of the amplitude of the communication signal at the output of the first non-final amplification stage within the first amplitude range.

13. A method for controlling gain in a receiver device, the method comprising:
   receiving, by an analog front end of the receiver device, a communication signal transmitted over a communication channel;
   amplifying the communication signal by an amplifier in the analog front end, the amplifier comprising a plurality of amplification stages, the plurality of amplification stages including a first non-final amplification stage and a final amplification stage;
   generating, by an analog to digital converter having an input coupled to an output of the final amplification stage, first digital samples of the communication signal at the input to the analog to digit converter for demodulation by the receiver device;
   generating, by a sampler of the receiver device, second digital samples of the communication signal at an output of the first non-final amplification stage; and
   controlling, by a digital gain control engine of the receiver device using i) the first digital samples of the communication signal output by the analog to digital converter and ii) the second digital samples of the communication signal at the output of the first non-final amplification stage, a gain of at least the first non-final amplification stage of the amplifier in the analog front end to track an envelope of the amplitude of the communication signal at the output of the first non-final amplification stage within a first amplitude range.

14. The method of claim 13, wherein:
   controlling the gain of the at least the first non-final amplification stage of the amplifier comprises controlling the gain of the at least the first non-final amplification stage to further track an envelope of an amplitude of the communication signal at an output of the analog to digital converter within a second amplitude range different from the first amplitude range.

15. The method of claim 14, wherein controlling the gain of the at least the first non-final amplification stage comprises controlling the gain of the at least the first non-final amplification stage of the amplifier based on a probability distribution of the second digital samples of the communication signal at an output of the sampler.

16. The method of claim 15, controlling the gain of the at least the first amplification stage comprises controlling the gain of the at least the first non-final amplification stage to maintain a constant difference between i) a first signal level that X percent of the first digital samples of the communication signal are below and ii) a second signal level that (100-X) percent of the first digital samples of the communication signal are below.

17. The method of claim 16, wherein:
   the sampler comprises a binary slicer, and
   controlling the gain of the at least the first non-final amplification stage of the amplifier includes:
      setting a slicing level of the binary slicer such that X percent of digital samples generated by the binary slicer are logic 1 and (100-X) percent of the digital samples generated by the binary slicer are logic 0,
      controlling the gain of the at least the first non-final amplification stage at least by i) reducing the gain of the first non-final amplification stage in response to determining that a percentage of digital samples generated by the binary slicer are logic 1 is greater than X and ii) i) increasing the gain of the first non-final amplification stage in response to determining that the percentage of digital samples generated by the binary slicer are logic 1 is less than X.

18. The method of claim 17, wherein controlling the gain of the at least the first non-final amplification stage of the amplifier includes:
   setting the gain of the first non-final amplification stage to an initial gain value such the envelope of the amplitude of the communication signal at the output of the analog to digital converter is initially within the second amplitude range,
   determining the slicing level of the binary slicer with the gain of the first non-final amplification stage to the initial gain value,
   setting the slicing level of the binary slicer to the determined slicing level, and
   controlling the gain of the at least the first non-final amplification stage the envelope of the amplitude of the communication signal at the output of the first non-final amplification stage based on monitoring the output of the binary slicer with the slicing level maintained at the determined slicing level.

19. The method of claim 17, further determining, by a signal detector of the receiver device, that the communication signal comprises a data signal rather than a pure noise signal when a number of digital samples of the communication signal generated by binary slicer exceeds a predetermined threshold.

20. The method of claim 14, further comprising
   performing, by an analog automatic gain control circuit of the receiver device, initial gain control of the plurality of amplification stages of the amplifier upon power-on of the receiver device,
   switching, by the digital gain control engine, gain control of the first non-final amplification stage from control of the analog automatic gain control circuit to control of the digital gain control engine while maintaining control of remaining one of more amplification stages among the plurality of the amplification stages under control of the analog automatic gain control circuit to provide fine tuning of power of the communication signal after the first non-final amplification stage, including:
      prior to switching gain control of the first non-final amplification stage from control of the analog automatic gain control circuit to control of the digital gain control engine, measuring an envelope of the amplitude of the communication signal with the gain of the first non-final amplification stage set by the analog automatic gain control circuit, and
      when switching gain control of the first non-final amplification stage from control of the analog automatic gain control circuit to control of the digital gain control engine i) initially setting the gain of the first non-final amplification stage to a maximum gain value, and ii) dialing down the gain of the first non-final amplification stage while measuring the envelope of the amplitude of the communication signal until the envelope of the amplitude the communication signal with the gain of the first non-final amplification stage set by the digital gain control engine matches the measured envelope of the amplitude of the communication signal with the gain of the first non-final amplification stage set by the analog automatic gain control circuit.

* * * * *